(12) United States Patent  (10) Patent No.: US 9,520,715 B2
Huang  (45) Date of Patent: Dec. 13, 2016

(54) ESD PROTECTION DEVICE OF TOUCH PANEL

(71) Applicant: Shanghai Tianma Micro-Electronics Co., Ltd., Shanghai (CN)

(72) Inventor: Zhongshou Huang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 395 days.

(21) Appl. No.: 14/096,302

(22) Filed: Dec. 4, 2013

(65) Prior Publication Data

US 2014/0092510 A1  Apr. 3, 2014

Related U.S. Application Data

(63) Continuation of application No. PCT/CN2012/084206, filed on Nov. 7, 2012.

(30) Foreign Application Priority Data

Sep. 25, 2012  (CN) .......................... 2012 1 0362951

(51) Int. Cl.
```
H02H 3/00      (2006.01)
H02H 3/02      (2006.01)
H02H 9/04      (2006.01)
G02F 1/1362    (2006.01)
G06F 3/044     (2006.01)
```
(52) U.S. Cl.
CPC ........ *H02H 9/045* (2013.01); *G02F 1/136204* (2013.01); *G06F 3/044* (2013.01); *H02H 9/046* (2013.01); *G06F 2203/04103* (2013.01); *G06F 2203/04107* (2013.01)

(58) Field of Classification Search
CPC .................................. H02H 9/04; H02H 9/046
USPC ............................................................ 361/56
See application file for complete search history.

(56) References Cited

U.S. PATENT DOCUMENTS

| 2002/0057392 | A1  | 5/2002 | Ha |
| 2005/1090168 |     | 9/2005 | Jiang et al. |
| 2009/0174975 | A1* | 7/2009 | Huang ............... G09G 3/3611 361/56 |

FOREIGN PATENT DOCUMENTS

| CN | 1748237 A   | 3/2006 |
| CN | 101221330 B | 7/2008 |
| CN | 101995985 A | 3/2011 |

OTHER PUBLICATIONS

Office Action as issued in corresponding Chinese Application No. 2015080400733430, dated Aug. 7, 2015.

(Continued)

*Primary Examiner* — Dharti Patel
(74) *Attorney, Agent, or Firm* — Alston & Bird LLP (57) ABSTRACT

An ESD protection device for a touch panel is disclosed. The protection device includes an ESD protection circuit, and a protection switch connected in series with the ESD protection circuit. The protection switch is configured to turn on in response to an electrostatic potential of a sensing line or a driving line of the touch panel being equal to or greater than a preset potential, such that static electricity from the sensing line or the driving line is conducted to a peripheral common electrode busbar, or to an ESD discharge busbar, or to a ground busbar. In addition, the protection switch is configured to turn off in response to a panel of the touch panel being normally driven.

11 Claims, 5 Drawing Sheets

(56) References Cited

OTHER PUBLICATIONS

International Search Report for PCT/CN2012/084206, dated Jul. 4, 2013, 13 pages.
Extended Search Report as received in corresponding European Application No. 12879147.2, dated Apr. 25, 2016.

* cited by examiner

ESD PROTECTION DEVICE OF TOUCH PANEL

This application claims priority to and is a Continuation of PCT/CN2012/084206, filed on Nov. 7, 2012, and entitled "ESD PROTECTION DEVICE OF TOUCH PANEL", which application claims the benefit of Chinese Patent Application No. 201210362951.4, filed with the Chinese Patent Office on Sep. 25, 2012, and entitled "ESD PROTECTION DEVICE OF TOUCH PANEL", the contents of which are incorporated herein by reference in their entirety.

FIELD OF THE INVENTION

The present invention relates to the field of touch panel technologies, and in particularly to an Electro-Static Discharge (ESD) protection device for a touch panel.

BACKGROUND OF THE INVENTION

A Thin Film Transistor (TFT) Liquid Crystal Display (LCD) is one of Active Matrix Liquid Crystal Displays (AM-LCDs). So far, the TFT-LCD is the unique display device comparable with or superior to the Cathode Ray Tube (CRT) display device in terms of comprehensive performances including brightness, contrast, power consumption, service life, volume, weight and the like. TFT-LCDs have been increasingly widely used due to their excellent performances, and good characters for mass production, including high automation level and low costs of raw material.

A TFT-LCD touch panel is a device used for outputting two-dimensional image signals, like an image capturing device, a touch panel with charge integrating amplifiers is a device for outputting two-dimensional spatial touch signals, and sensing lines need to capture relatively small extraneous signals. Accordingly, it is essential to suppress various dark background noise including static and dynamic dark currents from the sensing lines of the touch panel.

Figure 1:
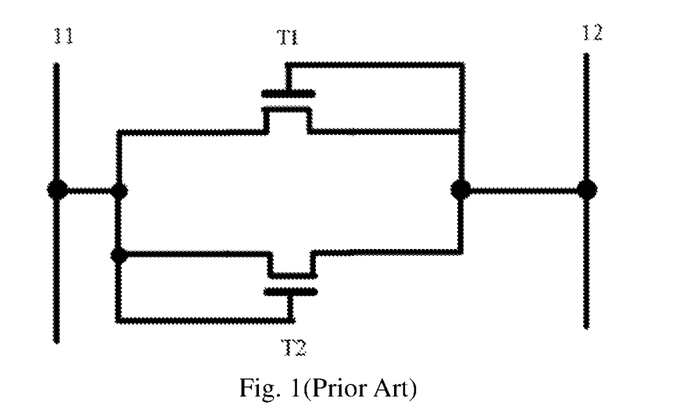
FIG. 1 is a schematic view showing an ESD protection circuit in the prior art.

Due to the relatively large capacitance of touch electrodes, the static electricity caused by a small amount of charges would not cause the breakdown of an insulating film, thus the presently available capacitive touch panels have not been provided with any ESD protection circuits. However, after the resolution of touch electrodes is increased significantly, the capacitance of each touch electrode becomes smaller. In the manufacturing process, the occurrence probability of an electrostatic damage increases with the enlargement of the substrate of the touch panel. Accordingly, an ESD protection circuit dedicated to the touch panel needs to be added to a TFT-LCD panel, and is connected to a sensing or driving electrode of the touch panel through the upper and lower electrical connection. As shown in FIG. 1, the ESD protection circuit used in the existing and most commonly used TFT-LCD, the ESD protection circuit is used for protecting data lines and scanning lines of the TFT-LCD from the breakdown caused by static electricity. Apparently, the ESD protection circuit can also be used to protect driving signal electrodes and sensing signal electrodes of the touch panel from the breakdown caused by static electricity.

The ESD protection circuit illustrated in FIG. 1, the ESD protection circuit includes two TFTs (T1 and T2) connected in a back-to-back manner, is connected between a ground line 12 and a sensing line or driving line 11.

Figure 2:
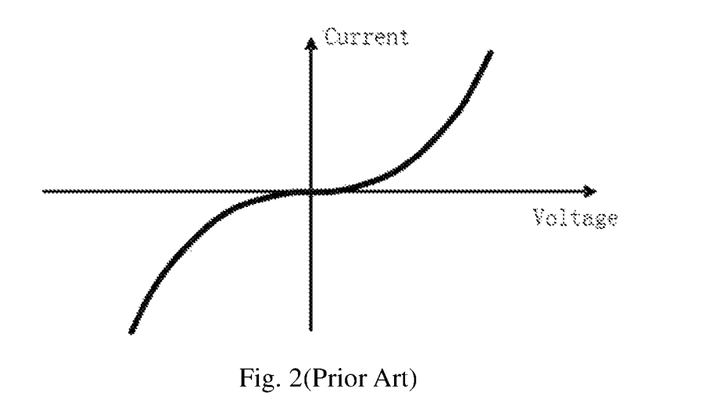
FIG. 2 is a graph showing the relationship between static leak current of the ESD protection circuit illustrated in FIG. 1 and voltage across of the ESD protection circuit illustrated in FIG. 1.

FIG. 2 illustrates a graph showing both static leak current of the ESD protection circuit illustrated in FIG. 1 and voltage across of the ESD protection circuit illustrated in FIG. 1.

During the manufacturing of the product, the ESD protection circuit illustrated in FIG. 1 can be used to rapidly release both static charges accumulated on a glass substrate and static charges transferred from machines and environment, thus to protect the TFT-LCD touch panel. However, in the normal driving of the TFT-LCD touch panel, the static leak current of the ESD protection circuit would likely cause the saturation or malfunction of a pre-amplifier (such as a charge integrating amplifier) of the touch panel.

Accordingly, those skilled in the art need to solve the problem of an influence on the TFT-LCD touch panel caused by the static leak current of the ESD protection circuit.

BRIEF SUMMARY OF THE INVENTION

One inventive aspect is an ESD protection device for a touch panel. The protection device includes an ESD protection circuit, and a protection switch connected in series with the ESD protection circuit. The protection switch is configured to turn on in response to an electrostatic potential of a sensing line or a driving line of the touch panel being equal to or greater than a preset potential, such that static electricity from the sensing line or the driving line is conducted to a peripheral common electrode busbar, or to an ESD discharge busbar, or to a ground busbar. In addition, the protection switch is configured to turn off in response to a panel of the touch panel being normally driven.

DETAILED DESCRIPTION OF THE INVENTION

Further detailed description of the specific embodiments of the present invention will be made below in conjunction with the accompanying drawings in order for better understanding on the purpose, characters and advantages of the present invention.

Figure 3:
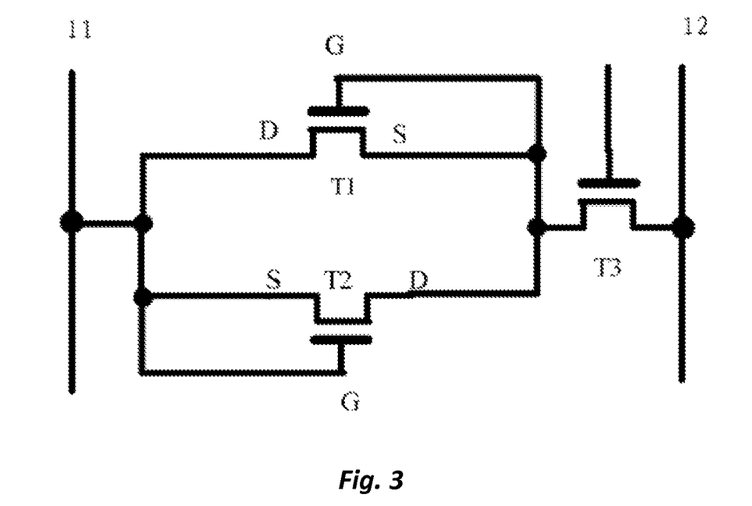
FIG. 3 is a schematic view showing the ESD protection device for the touch panel according to a first embodiment of the present invention.

FIG. 3 is a schematic view showing a first embodiment of the ESD protection device for the touch panel according to the present invention.

An ESD protection device according to the embodiment of the present invention includes an ESD protection circuit and a protection switch connected in series to the ESD protection circuit.

It should be noted that the ESD protection circuit according to the present embodiment is implemented by a pair of TFTs connected in a back-to-back manner. As illustrated in FIG. 3, the ESD protection circuit includes two TFTs connected in a back-to-back manner, i.e. a first Thin Film Transistor T1 and a second Thin Film Transistor T2. It should be understood that the ESD protection circuit can be alternatively embodied by other transistors in other connection manners. For example, the ESD protection circuit may include a plurality of pairs of TFTs connected in series, or in parallel, or in a combination of serial and parallel connections.

The connection manner of the pair of TFTs illustrated in FIG. 3 is as follows.

The connection in a back-to-back manner refers to that the gate G of the TFT T1 and the source S of the TFT T1 are connected with the drain D of the TFT T2, and the drain D of the TFT T1 is connected with the gate G of the TFT T1 and the source S of the TFT T2.

It should be noted that the above connection manner of the Thin Film Transistors is just an illustrative embodiment, and many connection manners are available depending on types of Thin Film Transistors.

When the electrostatic potential of a sensing line or a driving line of the touch panel is equal or greater than the preset potential, the protection switch T3 is turned on so that the TFTs T1 and T2 of the ESD protection circuit are in conduction with the protection switch T3, to conduct the static electricity from the sensing line or the driving line 11 to the peripheral common electrode busbar, or ESD discharge busbar, or ground busbar 12, thus protecting the drive signal electrodes of the touch panel and sense signal electrodes of the touch panel from breakdown caused by the static electricity.

When the panel of the touch panel is normally driven, the protection switch T3 is turned off so as to isolate the common electrode busbar, or the ESD discharge busbar, or the ground busbar 12 at the periphery of the touch panel, so that the sense signals of the touch panel are prevent from leaking to an external detecting circuit connected to the sensing lines, for example, the leak current of a pre-amplifier of the touch panel is prevented from leaking to the peripheral circuit. The TFTs T1 and T2 of the ESD protection circuit and the protection switch T3 operate based on the same mechanism as described above, and the The TFTs T1 and T2 of the ESD protection circuit and the protection switch T3 are connected with driving lines. When the touch panel is normally driven, the protection switch is in an off state, so as to prevent the drive signals from leaking to the common electrode busbar, or the ESD discharge busbar, or the ground busbar 12 at the periphery of the touch panel through the driving lines 11, and hence prevent increased power consumption of the driving. Further, the static leaking current, which influences the touch panel, can be remarkably reduced. As a result, the influence on the TFT-LCD touch panel caused by the static leaking current of the ESD protection circuit can be effectively avoided.

The protection switch in the present embodiment is described as a TFT for example, such as the protection switch T3 illustrated in FIG. 3. The protection switch T3 may be controlled to turn on and off by a control pulse applied to the protection switch T3's control gate.

It should be noted that the protection switch may be connected in series to the ESD protection circuit at various specific positions as below, referring to FIGS. 3-4: the protection switch T3 is connected between the ESD protection circuit and the sensing line of the touch panel; or the protection switch T3 is connected between the ESD protection circuit and the driving line of the touch panel; or the protection switch T3 is connected between the ESD protection circuit and the ESD discharge busbar; or the protection switch T3 is connected between the ESD protection circuit and the ground line; or the protection switch T3 is connected between the ESD protection circuit and the common electrode line.

Figure 4:
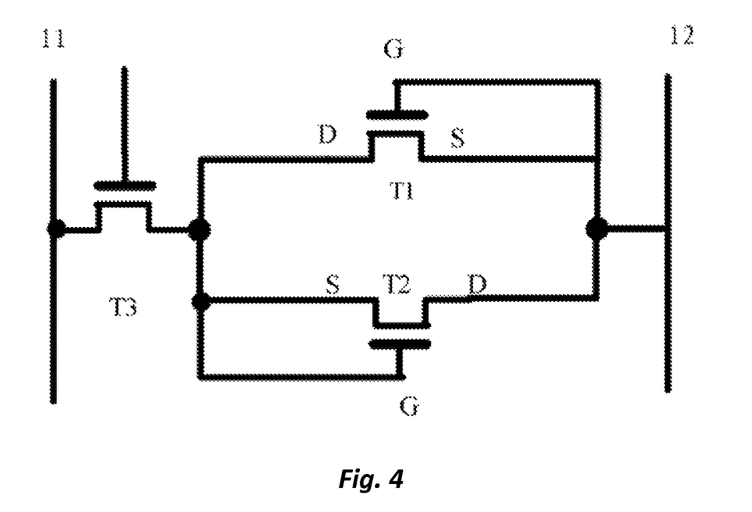
FIG. 4 is another schematic view showing the first embodiment of the ESD protection device for the touch panel according to the present invention.

The protection switch T3 is connected between the ESD protection circuit (formed by two TFTs T1 and T2 connected in a back-to-back manner) and the ground line 12 in the embodiment illustrated in FIG. 3, and the protection switch T3 is connected between the ESD protection circuit (formed by two TFTs T1 and T2 connected in a back-to-back manner) and the sensing line or the driving line 11 in the embodiment illustrated in FIG. 4.

Figure 5:
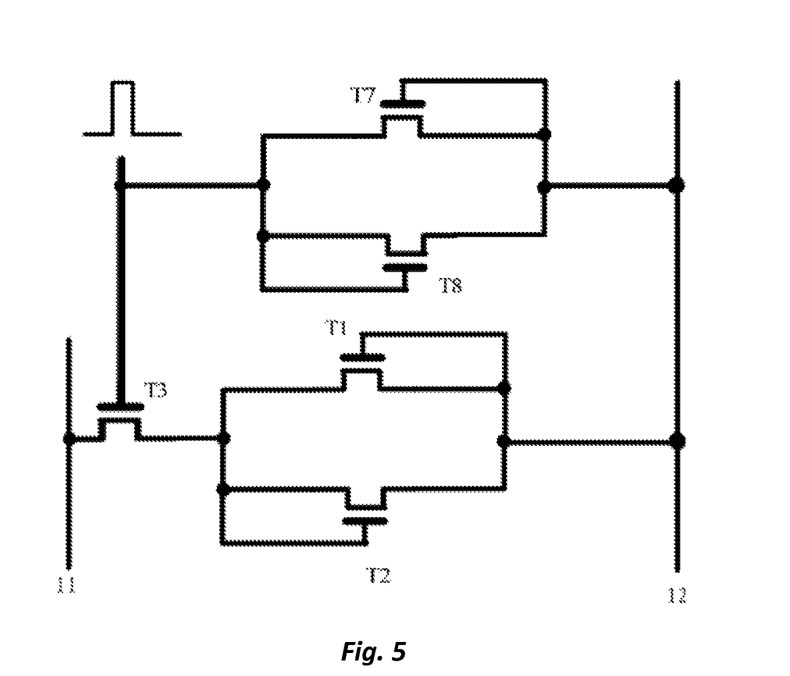
FIG. 5 is a schematic view showing a second embodiment of the ESD protection device for the touch panel according to the present invention.

FIG. 5 is a schematic view showing a second embodiment of the ESD protection device for the touch panel according to the present invention.

It should be noted that the protection switch is a third Thin Film Transistor T3. When the TFT T3 is connected between the ESD protection circuit (formed by two TFTs T1 and T2 connected in a back-to-back manner) and the sensing line 11 of the touch panel, or the TFT T3 is connected between the ESD protection circuit (formed by two TFTs T1 and T2 connected in a back-to-back manner) and the driving line 11 of the touch panel, the control gate of the TFT T3 is connected to a control pulse and simultaneously the control gate of the TFT T3 is connected to the ground busbar, or the common electrode busbar, or the ESD discharge line 12 via another ESD protection circuit (formed by two TFTs T7 and T8 connected in a back-to-back manner as illustrated in FIG. 5) or a resistive device (not shown).

The purpose of the embodiment shown in FIG. 5 is to avoid the floating state of the control gate of the third TFT in the manufacture process. When the electrostatic potential of the sensing line or the driving line 11 is relatively high, the static electricity can be leaked to the common electrode busbar, or the ESD discharge busbar, or the ground busbar through the ESD protection circuit formed by TFTs connected in a back-to-back manner. However, when the panel is normally driven, the TFT of the protection switch T3 is in off state.

Figure 6:
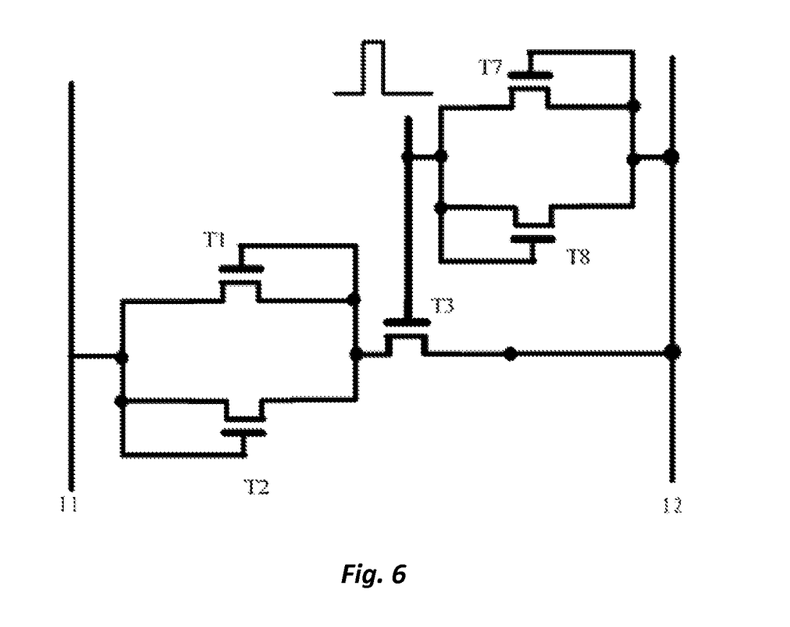
FIG. 6 is another schematic view showing the second embodiment of the ESD protection device for the touch panel according to the present invention.

It should be noted that the protection switch T3 of the embodiment illustrated in FIG. 6 may also be connected between the ESD protection circuit (formed by two TFTs T1 and T2 connected in a back-to-back manner) and the ground busbar, or the common electrode busbar, or the ESD discharge line 12, and further connected to the ground busbar, or the common electrode busbar, or the ESD discharge line 12 through another ESD protection circuit (formed by two TFTs T7 and T8 connected in a back-to-back manner) or a resistive device (not shown).

Figure 7:
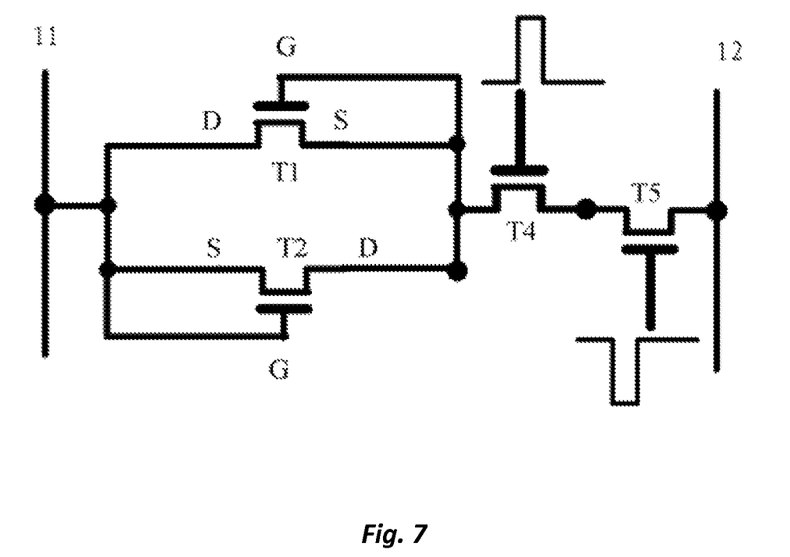
FIG. 7 is a schematic view showing a third embodiment of the ESD protection device for the touch panel according to the present invention.

FIG. 7 is a schematic view showing a third embodiment of the ESD protection device for the touch panel according to the present invention.

In the ESD protection device for the touch panel according to the present embodiment, the protection switch includes two TFT protection switches connected in series, such as the TFTs T4 and T5 illustrated in FIG. 7, and the control gates of these two TFTs are respectively controlled by two control pulses with inversed phases. That is, the TFT T4 and the TFT T5 are alternately turned on, particularly, the TFT T5 is turned off when the TFT T4 is turned on, and the TFT T5 is turned on when the TFT T4 is turned off.

The purpose of disposing such two protection switches T4 and T5 in the present embodiment is to prevent the drift of the threshold voltage of the TFT, and the drift of the threshold voltage of the TFT is caused by the direct current voltage at the control gate of the protection switch. When the TFT protection switch T4 is turned on, the other TFT protection switch T5 is turned off, so that a positive pulse and a negative pulse are alternately applied to the gates of these two TFT protection switches, thus, the impact of the pulses on the driving of movable ions in the gate isolation films of the TFTs can be automatically offset or compensated, thereby preventing a drift of the threshold voltage of the TFT, and the drift of the threshold voltage of the TFT is caused by the direct current voltages at the control gates of the protection switches.

The present invention also provides a fourth embodiment, in order to solve the problem of the drift in the threshold voltage of the TFT protection switch caused by the direct current voltage of the control gate of the protection switch.

Figure 8:
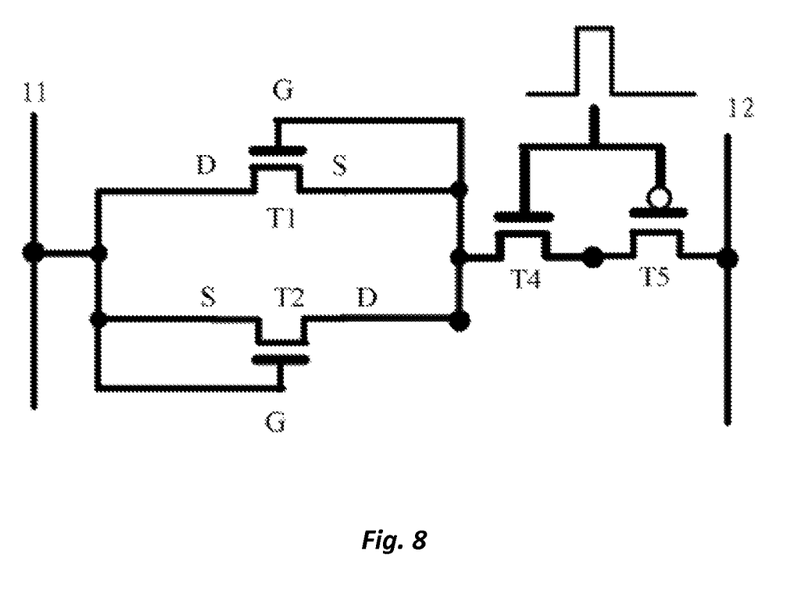
FIG. 8 is a schematic view showing a fourth embodiment of the ESD protection device for the touch panel according to the present invention.

Referring to FIG. 8 which is a schematic view showing a fourth embodiment of the ESD protection device for the touch panel according to the present invention, a difference between the ESD protection device for the touch panel according to the present embodiment and the ESD protection device of the third embodiment is that the protection switch includes two TFTs connected in series, i.e. a N-Mental-Oxide-Semiconductor (NMOS) transistor T4 and a P-Mental-Oxide-Semiconductor (PMOS) transistor T5, and the gate of the NMOS transistor T4 and the gate of the PMOS transistor T5 are controlled by the same control pulse. Because the condition of turning on the NMOS transistor T4 is opposite to the condition of turning on the PMOS transistor T5, the NMOS transistor T4 and the PMOS transistor T5 are alternately turned on when they are controlled by the same control pulse, that is, the NMOS transistor T4 is turned off when the PMOS transistor T5 is turned on, and the PMOS transistor T5 is turned off when the NMOS transistor T4 is turned on. Thus, when the touch panel operates normally, the leak current from Ground (GND) or short-circuiting bar can be isolated from the sensing line or the driving line 11, so as to significantly reduce the static leak current which affects the touch panel. As a result, the problem of the influences on the TFT-LCD touch panel caused by the static leak current of the ESD protection circuit can be effectively solved; simultaneously, the common electrode busbar, or the ESD discharge busbar, or the ground busbar 12 is isolated from the sensing line or driving line 11, in order to prevent sense signals or drive signals from leaking to the common electrode busbar, or the ESD discharge busbar or the ground busbar 12 at the periphery of the touch panel through the sensing line or the driving line, thus preventing the increased power consumption of the touch panel.

Figure 9:
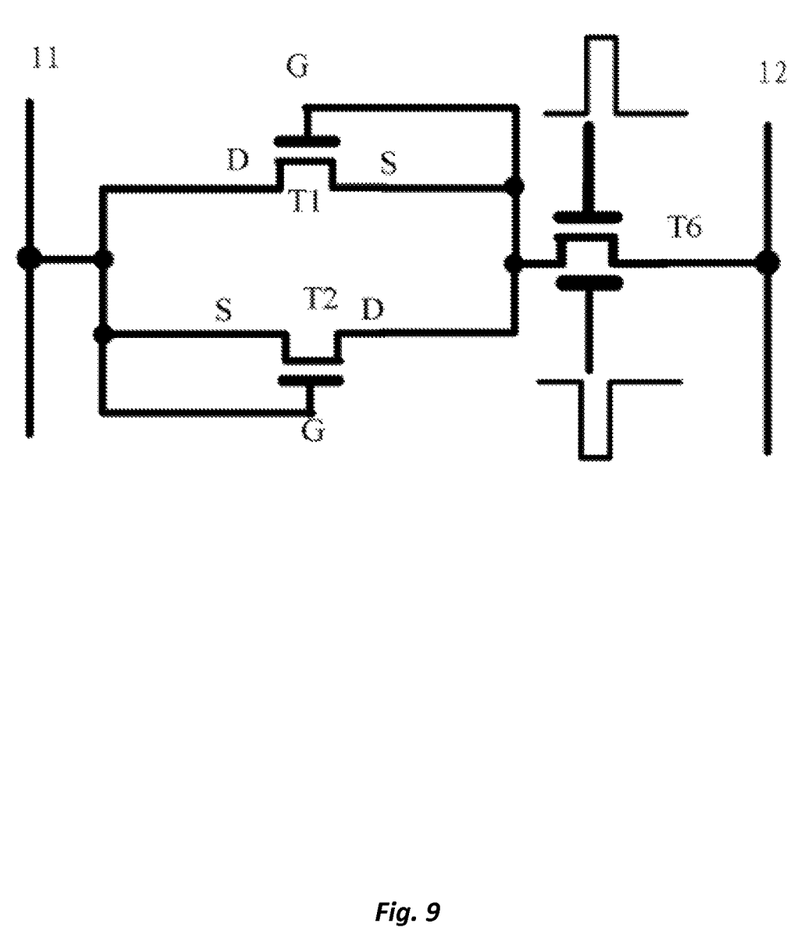
FIG. 9 is a schematic view showing a fifth embodiment of the ESD protection device for the touch panel according to the present invention.

FIG. 9 is a schematic view showing a fifth embodiment of the ESD protection device for the touch panel according to the present invention.

In the ESD protection device of the touch panel according to the present embodiment, the protection switch is a dual-gate TFT made of Low Temperature Poly Silicon (LTPS), or Cadmium Selenide (CdSe), or Oxide semiconductor (such as Indium Gallium Zinc Oxide), meanwhile the top gate of the dual-gate TFT and the bottom gate of the dual-gate TFT are respectively controlled by two control pulses with inverting phases. Such top gate and bottom gate can control the beneath electronic channel at the same time. If being controlled by external pulses with inversed phases, the influence of both the top gate and the bottom gate is counteracted on the electronic channel so that the dual-gate TFT is maintained in the off state.

It should be noted that the protection switch and the TFT array of the display are arranged on the same substrate in the ESD protection device of the touch panel according to above embodiments of the present invention.

It should be noted that the ESD protection device of the touch panel according to above embodiments of the present invention can be applied to a two-dimensional image receiver or a two-dimensional image capturing device, such as an X-ray image sensor, or a two-dimensional touch panel.

Preferable embodiments have been described above, not are not intended to limit the present invention in any way. In light of the above methods and technical contents described above, any of those skilled in the art can make many possible changes and modifications on the technical solution of the present invention or obtain an equivalent embodiment with equivalent changes, without departing from the scope of the technical solution of the present invention. Accordingly, any simply change, equivalent variation and modification to the above embodiments according to technical concept of the present without departing from the contents of the technical solution of the invention shall fall in the scope of the technical solution of the present invention.

What is claimed is:

1. An ElectroStatic Discharge (ESD) protection device for a touch panel, the protection device comprising:
    a first ESD protection circuit; and
    a protection switch connected in series with the ESD protection circuit,
    wherein the protection switch is configured to turn on in response to an electrostatic potential of a sensing line of the touch panel or a driving line of the touch panel being equal to or greater than a preset potential, such that static electricity from the sensing line or the driving line is conducted to a peripheral common electrode busbar, or to an ESD discharge busbar, or to a ground busbar, and
    wherein the protection switch is configured to turn off in response to a panel of the touch panel being normally driven, and
    wherein the protection switch comprises a first Thin Film Transistor, and a control gate of the first Thin Film Transistor is connected to a control pulse, and wherein the control gate of the first Thin Film Transistor is connected to the ground busbar, the common electrode busbar, or the ESD discharge busbar through a second ESD protection circuit.

2. The ESD protection device for the touch panel according to claim 1, wherein:
    the protection switch is connected between the first ESD protection circuit and the sensing line of the touch panel; or
    the protection switch is connected between the first ESD protection circuit and the driving line of the touch panel; or
    the protection switch is connected between the first ESD protection circuit and the ESD discharge busbar; or
    the protection switch is connected between the first ESD protection circuit and the ground busbar; or
    the protection switch is connected between the first ESD protection circuit and the common electrode busbar.

3. The ESD protection device for the touch panel according to claim 1, wherein the first ESD protection circuit includes at least one protection switch.

4. The ESD protection device for the touch panel according to claim 1, wherein the protection switch further includes a second Thin Film Transistor, and the first Thin Film Transistor and the second Thin Film Transistor are connected in series with each other, the control gate of the first Thin Film Transistor and the control gate of the second Thin Film Transistor are controlled by two mutually inverting control pulses, and the first Thin Film Transistor and the second Thin Film Transistor are both PMOS transistors or are both NMOS transistors.

5. The ESD protection device for the touch panel according to claim 1, wherein the protection switch further includes a third Thin Film Transistor, and the first Thin Film Transistor and the third Thin Film Transistor are connected in series with each other, wherein one of the Thin Film Transistors is an NMOS transistor, and the other one of the Thin Film Transistors is a PMOS transistor, and a gate of the NMOS transistor and a gate of the PMOS transistor are controlled by the same control pulse.

6. The ESD protection device for the touch panel according to claim 1, wherein the protection switch is a dual-gate Thin Film Transistor made of Low Temperature Poly Silicon, or Cadmium Selenide, or Oxide semiconductor, and the dual-gate Thin Film Transistor includes a top gate and a bottom gate, and the top gate and the bottom gate are respectively controlled by two mutually inverting control pulses.

7. The ESD protection device for the touch panel according to claim 1, wherein the first ESD protection circuit includes a pair of Thin Film Transistors, the pair of Thin Film Transistors comprising a fourth Thin Film Transistor and a fifth Thin Film Transistor, and the fourth Thin Film Transistor and the fifth Thin Film Transistor are connected with each other in a back-to-back configuration.

8. The ESD protection device for the touch panel according to claim 7, wherein multiple pairs of Thin Film Transistors of the first ESD protection circuit are connected in series, or in parallel, or in a combination of series and parallel.

9. The ESD protection device for the touch panel according to claim 1, wherein the first ESD protection circuit, the protection switch, and a Thin Film Transistor array of the display are disposed on the same substrate.

10. The ESD protection device for the touch panel according to claim 9, wherein the ESD protection device is connected to:
   an imaging device of two-dimensional images; or
   a sensor based on mechanical touch and pressure; or
   a sensor based on two-dimensional spatial information generated by a direct or indirect effect of sonic waves, or light waves or electromagnetic waves.

11. The ESD protection device for the touch panel according to claim 9, wherein the Thin Film Transistor array is configured to drive a Liquid Crystal Display or an Organic Light-Emitting Diode array.

* * * * *